(12) United States Patent
Kondo et al.

(10) Patent No.: US 11,913,567 B2
(45) Date of Patent: Feb. 27, 2024

(54) ELECTROMAGNETIC VALVE MANIFOLD

(71) Applicant: CKD CORPORATION, Komaki (JP)

(72) Inventors: Takemoto Kondo, Komaki (JP);
Kazuya Nakata, Komaki (JP); Shinji Itoh, Komaki (JP); Yosuke Eguchi, Komaki (JP); Kiyotoki Natsume, Komaki (JP); Ikuo Ogino, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/846,382

(22) Filed: Jun. 22, 2022

(65) Prior Publication Data
US 2022/0412480 A1 Dec. 29, 2022

(30) Foreign Application Priority Data

Jun. 25, 2021 (JP) .................. 2021-105312

(51) Int. Cl.
*F16K 31/06* (2006.01)
*F16K 27/00* (2006.01)

(52) U.S. Cl.
CPC ........ *F16K 31/0675* (2013.01); *F16K 27/003* (2013.01)

(58) Field of Classification Search
CPC .. F16K 31/0675; F16K 27/003; F16K 27/029; F16K 27/048; F15B 13/0857; F15B 13/0853; F15B 13/0875; F15B 13/0839; F15B 13/0825; F15B 13/0889; F15B 13/0817; Y10T 137/87885
See application file for complete search history.

(56) References Cited

U.S. PATENT DOCUMENTS

| | | | | | |
|---|---|---|---|---|---|
| 5,699,830 | A | * | 12/1997 | Hayashi | ................ F16K 27/003 137/554 |
| 5,918,629 | A | * | 7/1999 | Hayashi | .............. F15B 13/0825 137/884 |
| 6,053,198 | A | * | 4/2000 | Atkin | .................. F15B 13/0864 137/271 |
| 6,164,335 | A | * | 12/2000 | Hayashi | .............. F15B 13/0828 137/884 |

(Continued)

FOREIGN PATENT DOCUMENTS

JP 2009-092173 A 4/2009

*Primary Examiner* — David Colon-Morales
(74) *Attorney, Agent, or Firm* — TAROLLI, SUNDHEIM, COVELL & TUMMINO L.L.P.

(57) ABSTRACT

An electromagnetic valve manifold includes valve assemblies arranged in a single direction, each valve assembly including electromagnetic valves arranged in the single direction, a slave station disposed at one of ends of the electromagnetic valve manifold in the single direction, and a valve driving unit disposed in correspondence with each of the valve assemblies. The slave station includes a slave station output port that sends a control signal and valve driving unit power to the valve driving units. The valve driving units each include an electromagnetic valve power input port that receives electromagnetic valve power from an external device and a circuit board configured to control driving of the electromagnetic valves of a corresponding one of the valve assemblies using the control signal and send the electromagnetic valve power to the electromagnetic valves.

4 Claims, 8 Drawing Sheets

(56) References Cited

U.S. PATENT DOCUMENTS

| | | | | |
|---|---|---|---|---|
| 6,170,527 B1* | 1/2001 | Hayashi | F16K 27/003 | 137/884 |
| 6,173,731 B1* | 1/2001 | Ottliczky | F15B 13/0867 | 137/271 |
| 6,173,745 B1* | 1/2001 | Hayashi | F16K 27/003 | 137/884 |
| 6,213,153 B1* | 4/2001 | Hayashi | F15B 13/0817 | 137/884 |
| 6,216,738 B1* | 4/2001 | Ruckwied | F15B 13/0867 | 137/884 |
| 6,475,036 B2* | 11/2002 | Morikawa | H01R 13/6395 | 439/716 |
| 6,513,547 B2* | 2/2003 | Endo | F15B 13/0857 | 137/884 |
| 6,704,815 B1* | 3/2004 | Morikawa | H01R 13/52 | 700/19 |
| 7,623,351 B2* | 11/2009 | Moeker | F15B 13/0857 | 361/752 |
| 7,849,881 B2* | 12/2010 | Lee | F15B 13/0853 | 137/884 |
| 8,375,986 B2* | 2/2013 | Miyazoe | F15B 13/0857 | 137/884 |
| 9,080,679 B2* | 7/2015 | Kuhbauch | F16K 27/003 | |
| 10,006,557 B2* | 6/2018 | De Carolis | F15B 13/0857 | |
| 2001/0003289 A1* | 6/2001 | Mead | F15B 13/0867 | 137/884 |
| 2009/0095930 A1 | 4/2009 | Miyazoe | | |

\* cited by examiner

ELECTROMAGNETIC VALVE MANIFOLD

RELATED APPLICATIONS

The present invention is a U.S. Patent application, claiming priority to Japanese Patent Application No. 2021-105312 filed on Jun. 25, 2021; the entireties of both are hereby incorporated herein by reference.

BACKGROUND

1. Field

The present disclosure relates to an electromagnetic valve manifold.

2. Description of Related Art

Japanese Laid-Open Patent Publication No. 2009-92173 discloses an example of an electromagnetic valve manifold including valve assemblies arranged in a first direction, each valve assembly including electromagnetic valves arranged in the first direction. Such an electromagnetic valve manifold includes a slave station disposed at one of the ends of the valve assemblies in the first direction. The slave station receives, from a master station, a control signal used to control driving of the electromagnetic valves. In the above-described literature, for example, the valve assemblies are electrically connected to each other in a row. The control signal from the master station and electromagnetic valve power, which is used to drive the electromagnetic valves of each valve assembly, are sequentially delivered to the electromagnetic valves of each valve assembly from the electromagnetic valves of the valve assembly that is closest to the slave station. In this manner, the electromagnetic valve power is supplied to the electromagnetic valves of each valve assembly so that the electromagnetic valves are driven using the control signal.

In the above-described literature, the electromagnetic valve power is sequentially delivered from the electromagnetic valves of the valve assembly that is closest to the slave station. In such a configuration, the farther the electromagnetic valves of the valve assembly are from the slave station, the more easily the voltage of the electromagnetic valve power drops. Thus, the farther the electromagnetic valves of the valve assembly are from the slave station, the more easily malfunction may occur.

When the valve assemblies are electrically connected to each other in a row, a connector that electrically connects adjacent electromagnetic valves to each other needs to have the number of output points that corresponds to the total number of electromagnetic valves of the entire electromagnetic valve manifold. Thus, in the electromagnetic valve manifold, an increase in the number of the electromagnetic valves may necessitate the preparation of an additional connector having the number of output points that corresponds to the number of the electromagnetic valves, thereby increasing the sizes of the connectors. As a result, the size of the entire electromagnetic valve manifold increases.

In addition, it is desired that versatility is improved in the electromagnetic valve manifold in which the valve assemblies, each including electromagnetic valves arranged in the first direction, are arranged in the first direction as in the above-described literature.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An electromagnetic valve manifold according to an aspect of the present disclosure includes valve assemblies arranged in a single direction, each valve assembly including electromagnetic valves arranged in the single direction, and a slave station disposed at one of ends of the electromagnetic valve manifold in the single direction and configured to receive, from a master station, a control signal used to control driving of the electromagnetic valves. The electromagnetic valves each include a valve block through which a passage extends in the single direction. A fluid flows through the passage. The passages in adjacent ones of the valve blocks in the single direction connect to each other. The electromagnetic valve manifold further includes a valve driving unit disposed in correspondence with each of the valve assemblies. Each of the valve driving units is configured to control the driving of the electromagnetic valves of a corresponding one of the valve assemblies using the control signal from the slave station. The slave station includes a control signal input port that receives the control signal from the master station. The slave station includes a valve driving unit power input port that receives valve driving unit power from an external device. The valve driving unit power is used to drive each of the valve driving units. The slave station includes a slave station output port that sends, to the valve driving units, the control signal received by the control signal input port and the valve driving unit power received by the valve driving unit power input port. The valve driving units each include an electromagnetic valve power input port that receives electromagnetic valve power from an external device. The electromagnetic valve power is used to drive the electromagnetic valves of a corresponding one of the valve assemblies. The valve driving units each include a circuit board configured to control the driving of the electromagnetic valves of a corresponding one of the valve assemblies using the control signal from the slave station output port and send, to the electromagnetic valves, the electromagnetic valve power received by the electromagnetic valve power input port. The valve driving units each include a housing that accommodates the circuit board. The slave station output port and one of the valve driving units closest to the slave station are electrically connected to each other by a first cable. Adjacent ones of the valve driving units in the single direction are electrically connected to each other by a second cable configured to deliver the control signal and the valve driving unit power, sent to one of the adjacent ones of the valve driving units in the single direction, to the other one of the adjacent ones of the valve driving units in the single direction. The housing includes a passage sealing unit configured to seal the passage.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic valve manifold 10 according to an embodiment will now be described with reference to FIGS. 1 to 11.

Entire Structure of Electromagnetic Valve Manifold 10

Figure 1:
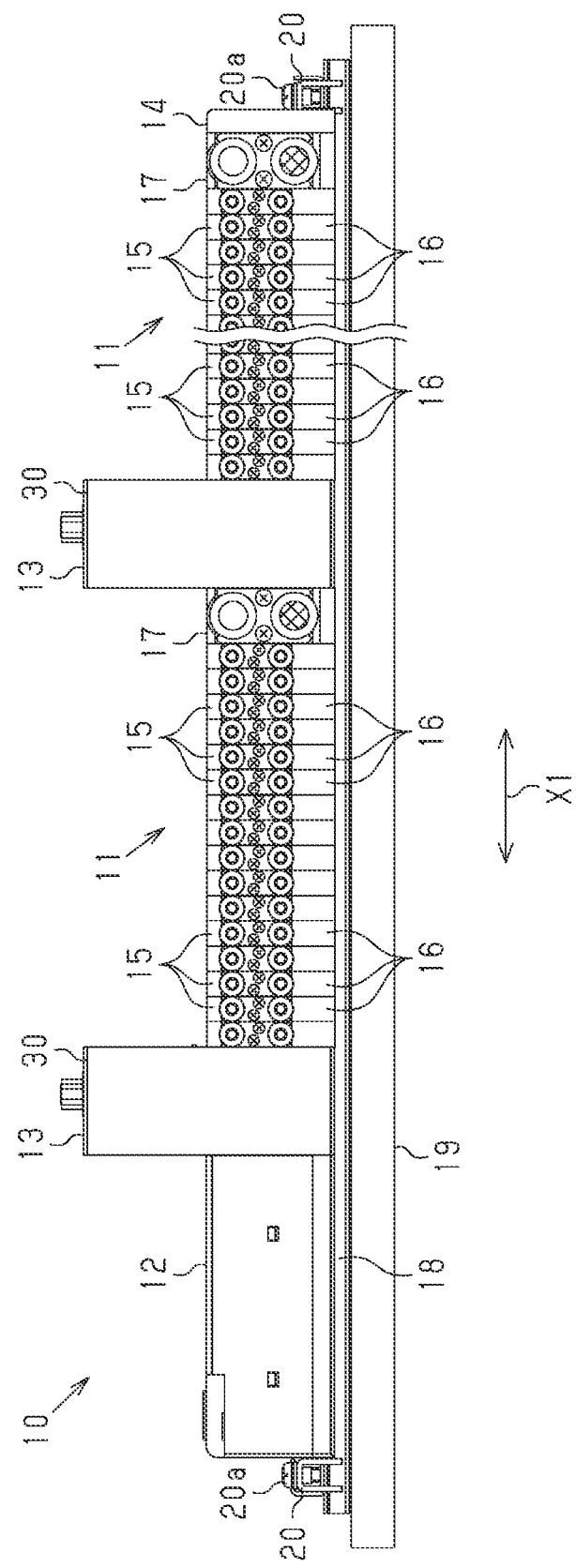
FIG. 1 is a side view showing an electromagnetic valve manifold according to an embodiment.
Figure 2:
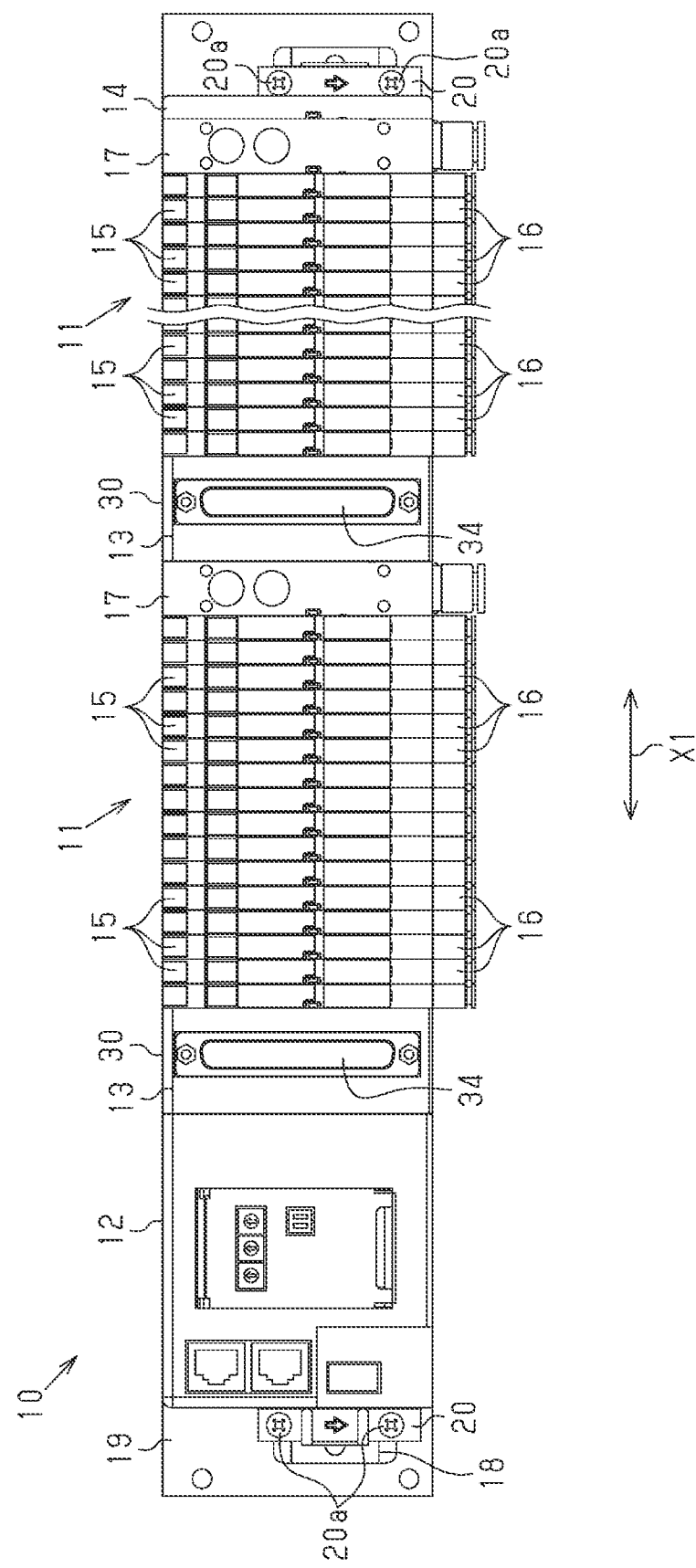
FIG. 2 is a top view of the electromagnetic valve manifold shown in FIG. 1.
Figure 3:
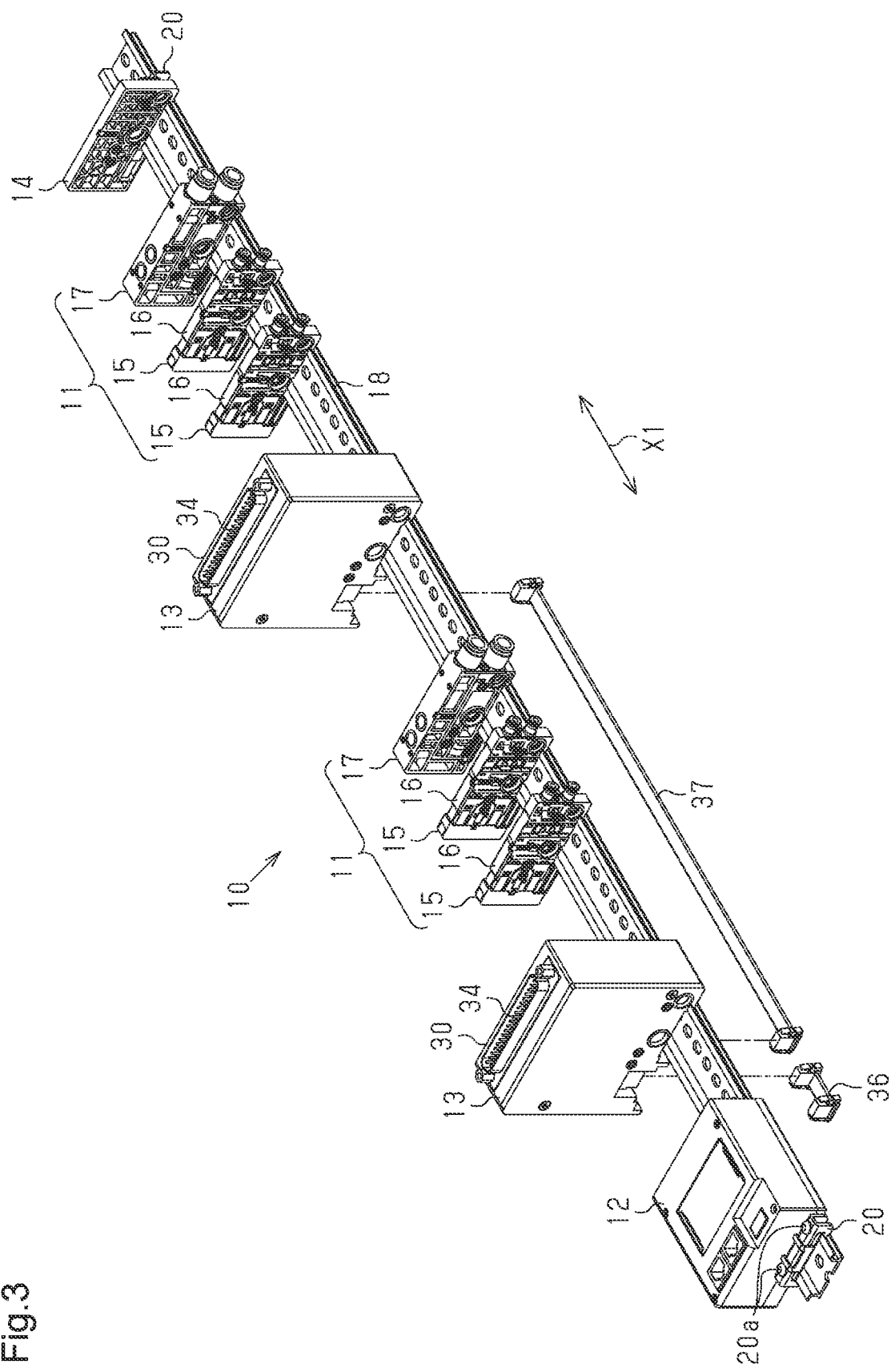
FIG. 3 is an exploded perspective view of the electromagnetic valve manifold shown in FIG. 1.

As shown in FIGS. 1, 2, and 3, the electromagnetic valve manifold 10 includes valve assemblies 11, a slave station 12, valve driving units 13, and an end block 14. The valve assemblies 11 are arranged in a single direction X1. The electromagnetic valve manifold 10 includes a first end and a second end in the single direction X1. In FIG. 1, the first end is the left end, and the second end is the right end.

Each valve assembly 11 includes electromagnetic valves 15. The electromagnetic valves 15 each include a valve block 16. Each valve block 16 has the shape of an elongated quadrilateral block. The electromagnetic valves 15 are arranged in the single direction X1. More specifically, the electromagnetic valves 15 are arranged with the single direction X1 coinciding with the thickness direction of each valve block 16.

The valve driving units 13 are disposed in correspondence with the valve assemblies 11. Each valve assembly 11 includes a first end and a second end in the single direction X1. Each valve driving unit 13 is arranged adjacent to, in the single direction X1, the electromagnetic valve 15 at the first end of the corresponding valve assembly 11. Each valve driving unit 13 includes a housing 30. Each housing 30 has the shape of an elongated quadrilateral box. Each valve driving unit 13 is disposed for the corresponding electromagnetic valve 15, with the lateral direction of the housing 30 coinciding with the thickness direction of the valve blocks 16 of the electromagnetic valves 15.

Each valve assembly 11 includes a supply-discharge block 17. Each supply-discharge block 17 has the shape of an elongated quadrilateral block. Each supply-discharge block 17 is located at the second end of the corresponding valve assembly 11. Each supply-discharge block 17 is disposed for the corresponding electromagnetic valve 15, with the thickness direction of the supply-discharge block 17 coinciding with the thickness direction of the valve blocks 16 of the electromagnetic valves 15.

The electromagnetic valve manifold 10 includes a rail 18 and a base 19. The rail 18 has the shape of a long thin plate. The base 19 has the shape of a long thin flat block. The rail 18 is mounted on the upper surface of the base 19, with the longitudinal direction of the rail 18 coinciding with the longitudinal direction of the base 19. The rail 18 is fixed to the upper surface of the base 19. The longitudinal direction of the rail 18 and the longitudinal direction of the base 19 coincide with the single direction X1.

The valve assemblies 11, the slave station 12, the valve driving units 13, and the end block 14 are arranged on the rail 18 and supported by the rail 18. Thus, the rail 18 extends in the single direction X1 and supports the electromagnetic valves 15. The valve assemblies 11, the slave station 12, the valve driving units 13, and the end block 14 are held by two fixing brackets 20 so as to prevent them from separating from each other in the single direction X1. Each fixing bracket 20 is held on the rail 18 by bolts 20a.

Structure of Electromagnetic Valve 15

Figure 4:
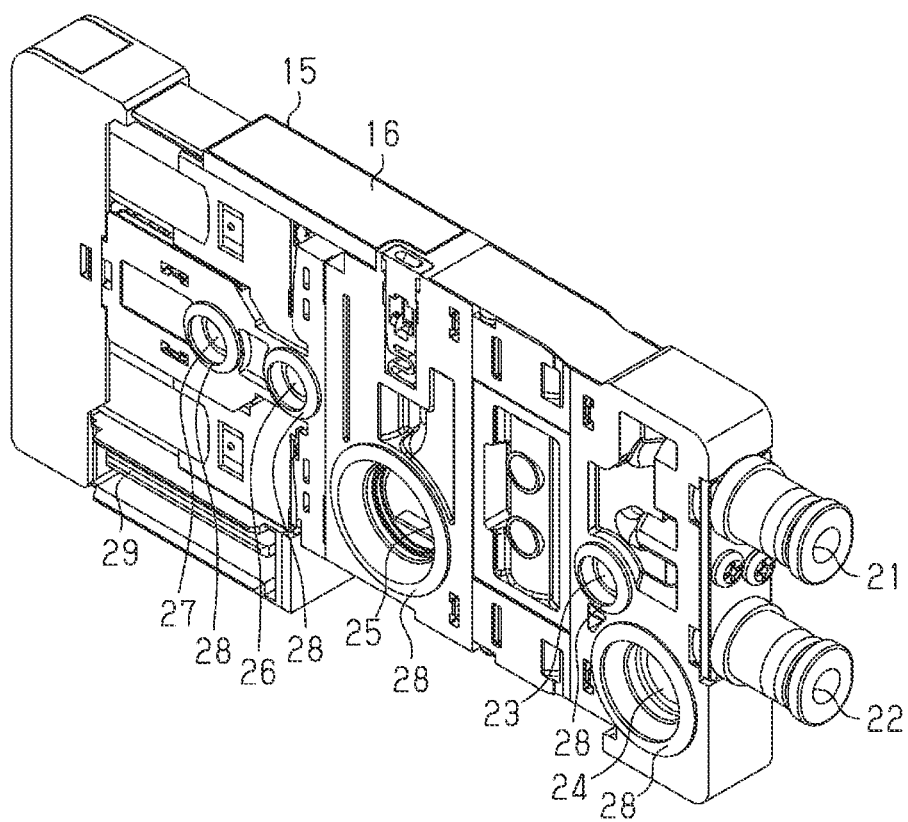
FIG. 4 is a perspective view of an electromagnetic valve of the electromagnetic valve manifold shown in FIG. 1.

As shown in FIG. 4, the valve block 16 of each electromagnetic valve 15 includes a first output port 21 and a second output port 22. The first output port 21 and the second output port 22 are connected to a fluid pressure device (not shown) by a pipe. Each valve block 16 includes a supply passage 23, a first discharge passage 24, and a second discharge passage 25 that extend through the valve block 16 in its thickness direction. Thus, the supply passage 23, the first discharge passage 24, and the second discharge passage 25 extend through the valve block 16 in the single direction X1. The supply passage 23, the first discharge passage 24, and the second discharge passage 25 are passages through which a fluid flows. More specifically, the fluid supplied to and discharged from the fluid pressure device through the first output port 21 and the second output port 22 flows through the supply passage 23, the first discharge passage 24, and the second discharge passage 25.

The supply passages 23 in the adjacent valve blocks 16 in the single direction X1 connect to each other. The first discharge passages 24 in the adjacent valve blocks 16 in the single direction X1 connect to each other. The second discharge passages 25 in the adjacent valve blocks 16 in the single direction X1 connect to each other.

Each valve block 16 includes a first pilot fluid discharge passage 26 and a second pilot fluid discharge passage 27 that extend through the valve block 16 in its thickness direction. Thus, the first pilot fluid discharge passage 26 and the second pilot fluid discharge passage 27 extend through the valve block 16 in the single direction X1. The first pilot fluid discharge passage 26 and the second pilot fluid discharge passage 27 are passages through which a fluid flows. More specifically, a pilot fluid, which is used to drive a valve member (not shown) incorporated in the valve block 16 of each electromagnetic valve 15, flows through the first pilot fluid discharge passage 26 and the second pilot fluid discharge passage 27.

The first pilot fluid discharge passages 26 in the adjacent valve blocks 16 in the single direction X1 connect to each other. The second pilot fluid discharge passages 27 in the adjacent valve blocks 16 in the single direction X1 connect to each other.

The electromagnetic valve 15 of the present embodiment is a known five-port electromagnetic valve. Thus, its internal structure will not be described in detail.

Annular seal members 28 are disposed on a surface at one end of the valve block 16 in its thickness direction. Each seal member 28 is disposed at the corresponding opening edge of the supply passage 23, the first discharge passage 24, the second discharge passage 25, the first pilot fluid discharge passage 26, and the second pilot fluid discharge passage 27.

The seal member 28 at the opening edge of each supply passage 23 hinders the leakage of a fluid flowing through the supply passages 23 that connect to each other in the adjacent valve blocks 16 in the single direction X1. The seal member 28 at the opening edge of each first discharge passage 24 hinders the leakage of a fluid flowing through the first discharge passages 24 that connect to each other in the adjacent valve blocks 16 in the single direction X1. The seal member 28 at the opening edge of each second discharge passage 25 hinders the leakage of a fluid flowing through the second discharge passages 25 that connect to each other in the adjacent valve blocks 16 in the single direction X1. The seal member 28 at the opening edge of each first pilot fluid discharge passage 26 hinders the leakage of a fluid flowing through the first pilot fluid discharge passages 26 that connect to each other in the adjacent valve blocks 16 in the single direction X1. The seal member 28 at the opening edge of each second pilot fluid discharge passage 27 hinders the leakage of a fluid flowing through the second pilot fluid discharge passages 27 that connect to each other in the adjacent valve blocks 16 in the single direction X1.

Each electromagnetic valve 15 includes a relay connector 29. The relay connector 29 extends through the valve block 16 in its thickness direction. The adjacent electromagnetic valves 15 in the single direction X1 are electrically connected to each other by connecting the relay connectors 29 to each other in a plug-in manner.

Structure of Slave Station 12

Figure 5:
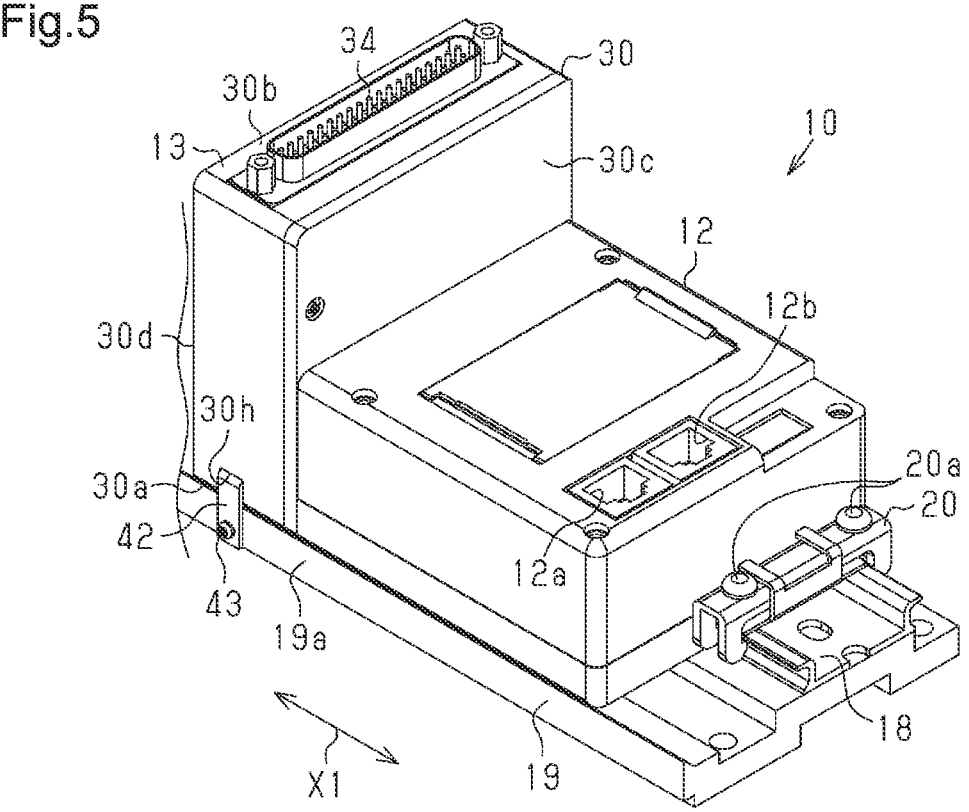
FIG. 5 is an enlarged perspective view of the surroundings of the slave station in the electromagnetic valve manifold shown in FIG. 1.

As shown in FIG. 5, the slave station 12 has the shape of a flat quadrilateral block. The slave station 12 is located at the first end of the electromagnetic valve manifold 10.

Figure 6:
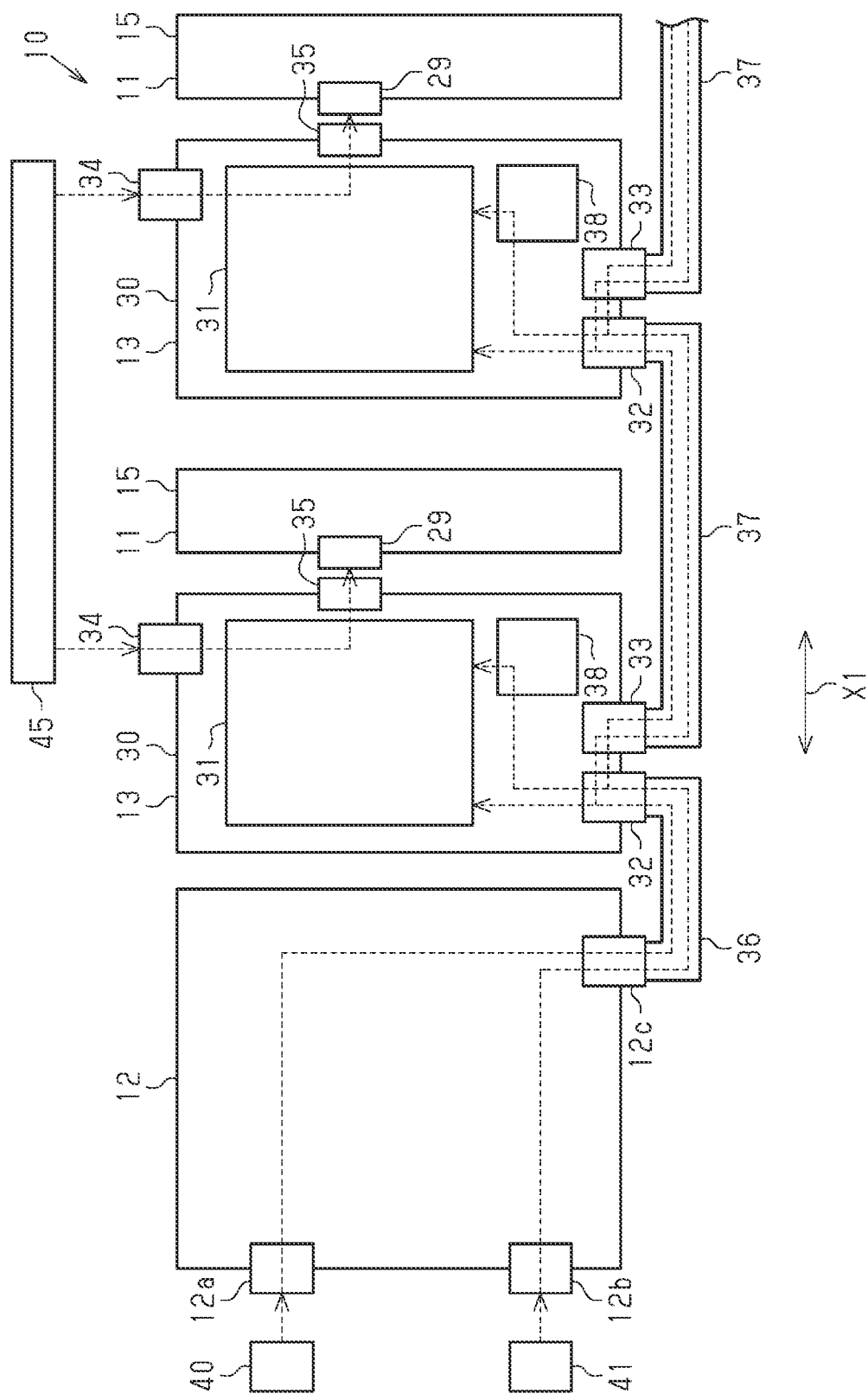
FIG. 6 is a block diagram showing the electrical configuration of the electromagnetic valve manifold shown in FIG. 1.

As shown in FIG. 6, the slave station 12 receives, from a master station 40, a control signal used to control driving of the electromagnetic valves 15. The slave station 12 includes a control signal input port 12a and a valve driving unit power input port 12b. The control signal input port 12a is connected to the master station 40. The control signal input port 12a receives the control signal from the master station 40. The valve driving unit power input port 12b is electrically connected to an external power supply 41. The valve driving unit power input port 12b receives, from the external power supply 41, valve driving unit power used to drive the valve driving units 13. Thus, the valve driving unit power input port 12b receives the valve driving unit power from an external device. The slave station 12 includes a slave station output port 12c that sends, to the valve driving units 13, the control signal received by the control signal input port 12a and the valve driving unit power received by the valve driving unit power input port 12b.

Bracket 42

As shown in FIG. 5, the electromagnetic valve manifold 10 includes a bracket 42. The bracket 42 fixes each valve driving unit 13 to the base 19. The bracket 42 has the shape of a strip plate bent in an L-shape. The bracket 42 includes a first end inserted through an insertion hole 30h that extends through the housing 30 of each valve driving unit 13. The bracket 42 includes a second end that is fixed to the base 19 by fastening, to a side surface 19a of the base 19, a screw 43 that extends through the second end of the bracket 42. Thus, each valve driving unit 13 is fixed to the base 19 by the bracket 42. Internal screw holes (not shown) to which the screws 43 can be fastened are arranged on the side surface 19a of the base 19 in the longitudinal direction of the base 19.

Entire Structure of Valve Driving Unit 13

As shown in FIG. 6, each valve driving unit 13 includes a circuit board 31. The circuit board 31 is accommodated in the housing 30. The circuit board 31 controls the driving of the electromagnetic valves 15 of each valve assembly 11 using the control signal from the slave station output port 12c. Thus, each valve driving unit 13 controls the driving of the electromagnetic valves 15 of the corresponding valve assembly 11 using the control signal from the slave station 12.

Figure 7:
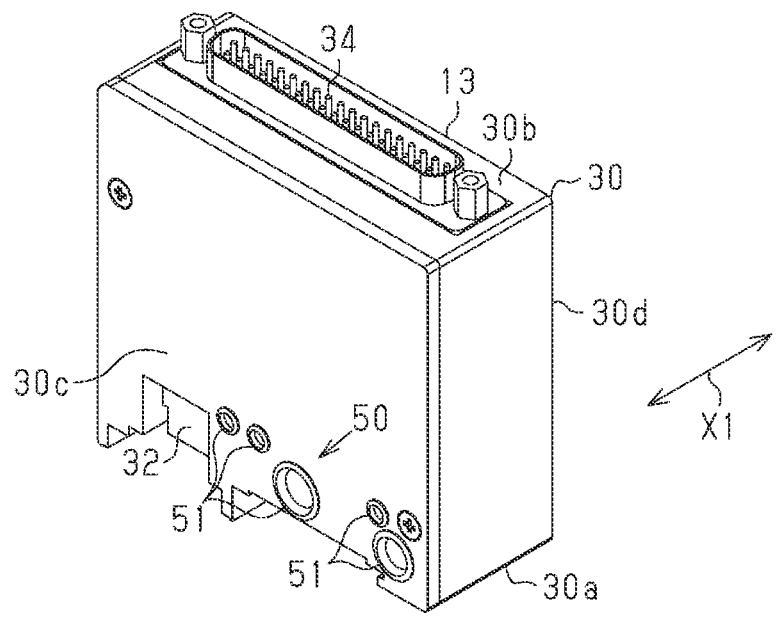
FIG. 7 is a perspective view of a valve driving unit of the electromagnetic valve manifold shown in FIG. 1.
Figure 8:
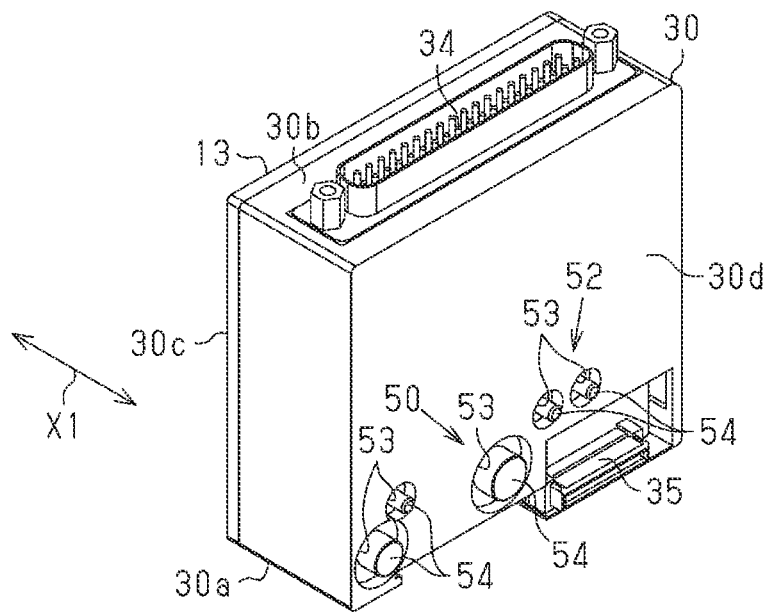
FIG. 8 is a perspective view of the valve driving unit shown in FIG. 7, as seen in another direction.
Figure 9:
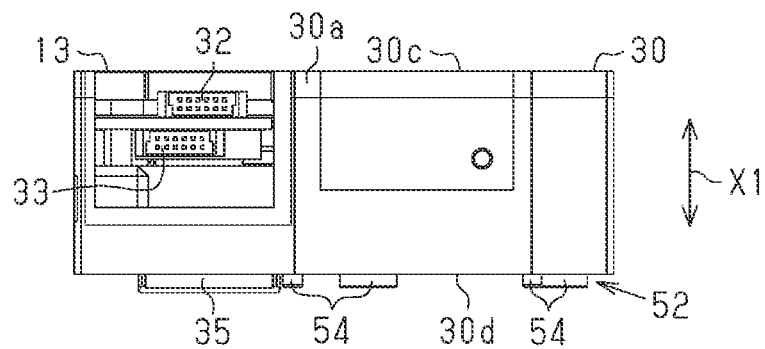
FIG. 9 is a bottom view of the valve driving unit shown in FIG. 7.

As shown in FIGS. 7, 8, and 9, the housing 30 includes a first surface 30a facing the rail 18 and the base 19, and a second surface 30b located opposite the first surface 30a. Further, the housing 30 includes a third surface 30c and a fourth surface 30d located opposite each other in the single direction X1. The third surface 30c and the fourth surface 30d are flat. The third surface 30c and the fourth surface 30d extend in parallel to each other. Each valve driving unit 13 is supported by the rail 18 such that the third surface 30c is closer to the slave station 12 than the fourth surface 30d.

Structures of Input-Side Connector 32 and Output-Side Connector 33

As shown in FIG. 9, each valve driving unit 13 includes an input-side connector 32 and an output-side connector 33. The input-side connector 32 and the output-side connector 33 are located on the first surface 30a. As shown in FIG. 6, the input-side connector 32 is electrically connected to the circuit board 31. The output-side connector 33 is electrically connected to the input-side connector 32 in the valve driving unit 13. As shown in FIG. 9, the input-side connector 32 is located closer to the third surface 30c than the output-side connector 33. Thus, each valve driving unit 13 is supported by the rail 18 such that the input-side connector 32 is located closer to the slave station 12 than the output-side connector 33.

Structure of Electromagnetic Valve Power Input Port 34

As shown in FIGS. 7 and 8, each valve driving unit 13 includes an electromagnetic valve power input port 34. The electromagnetic valve power input port 34 is a connector that protrudes from the second surface 30b. As shown in FIG. 6, the electromagnetic valve power input port 34 of each valve driving unit 13 is electrically connected to an external power supply 45. Each electromagnetic valve power input port 34 receives, from the external power supply 45, electromagnetic valve power used to drive the electromagnetic valves of the corresponding valve assembly 11. Thus, the electromagnetic valve power input port 34 receives the electromagnetic valve power from an external device. The external power supply 45, which sends the electromagnetic valve power to the electromagnetic valve power input port 34, is different from the external power supply 41, which sends the valve driving unit power to the valve driving unit power input port 12b. The electromagnetic valve power input port 34 is electrically connected to the circuit board 31.

Structure of Electromagnetic Valve Driving Connector 35

As shown in FIG. 8, each valve driving unit 13 includes an electromagnetic valve driving connector 35. The electromagnetic valve driving connector 35 is located on the fourth surface 30d. As shown in FIG. 6, the electromagnetic valve driving connector 35 is electrically connected to the circuit board 31. Each electromagnetic valve driving connector 35 is electrically connected to the relay connector 29 of the electromagnetic valve 15 at the first end of the corresponding valve assembly 11 through plug-in connection. The circuit board 31 sends the electromagnetic valve power, received by the electromagnetic valve power input port 34, from the electromagnetic valve driving connector 35 to the relay connector 29 of the electromagnetic valve 15. Thus, the circuit board 31 sends, to each electromagnetic valve 15, the electromagnetic valve power received by the electromagnetic valve power input port 34.

First Cable 36 and Second Cable 37

As shown in FIGS. 3 and 6, the electromagnetic valve manifold 10 includes a first cable 36 and a second cable 37. The first cable 36 electrically connects the slave station output port 12c to the input-side connector 32 of the valve driving unit 13 closest to the slave station 12. Thus, the slave station output port 12c and the valve driving unit 13 closest to the slave station 12 are electrically connected to each other by the first cable 36.

The second cable 37 electrically connects the output-side connector 33 of one of the adjacent valve driving units 13 in the single direction X1 to the input-side connector 32 of the other one of the adjacent valve driving units 13 in the single direction X1. Thus, the adjacent valve driving units 13 in the single direction X1 are electrically connected to each other by the second cable 37. The second cable 37 delivers the control signal and the valve driving unit power, sent to one of the adjacent valve driving units 13 in the single direction X1, to the other one of the adjacent valve driving units 13 in the single direction X1.

Regulator 38 of Each Valve Driving Unit 13

As shown in FIG. 6, each valve driving unit 13 includes a regulator 38. The regulator 38 reduces the voltage of the valve driving unit power sent from the slave station output port 12c of the slave station 12 to a driving voltage at the circuit board 31 of each valve driving unit 13. Thus, the valve driving unit power sent from the slave station output port 12c of the slave station 12 is set to be higher than the driving voltage at the circuit board 31 of each valve driving unit 13.

Structure of Passage Sealing Unit 50

As shown in FIGS. 7 and 8, the housing 30 includes a passage sealing unit 50. The passage sealing unit 50 includes annular seal members 51 on the third surface 30c of the housing 30, and a seal mechanism 52 on the fourth surface 30d of the housing 30.

The seal members 51 are located in correspondence with the supply passage 23, the first discharge passage 24, the second discharge passage 25, the first pilot fluid discharge passage 26, and the second pilot fluid discharge passage 27 on the third surface 30c of the housing 30.

When the electromagnetic valve 15 is disposed adjacent to the third surface 30c of the housing 30, the seal member 51 located in correspondence with the supply passage 23 is in close contact with the valve block 16 so as to surround the opening edge of the supply passage 23. Thus, the seal member 51 located in correspondence with the supply passage 23 seals the supply passage 23.

When the electromagnetic valve 15 is disposed adjacent to the third surface 30c of the housing 30, the seal member 51 located in correspondence with the first discharge passage 24 is in close contact with the valve block 16 so as to surround the opening edge of the first discharge passage 24. Thus, the seal member 51 located in correspondence with the first discharge passage 24 seals the first discharge passage 24.

When the electromagnetic valve 15 is disposed adjacent to the third surface 30c of the housing 30, the seal member 51 located in correspondence with the second discharge passage 25 is in close contact with the valve block 16 so as to surround the opening edge of the second discharge passage 25. Thus, the seal member 51 located in correspondence with the second discharge passage 25 seals the second discharge passage 25.

When the electromagnetic valve 15 is disposed adjacent to the third surface 30c of the housing 30, the seal member 51 located in correspondence with the first pilot fluid discharge passage 26 is in close contact with the valve block 16 so as to surround the opening edge of the first pilot fluid discharge passage 26. Thus, the seal member 51 located in correspondence with the first pilot fluid discharge passage 26 seals the first pilot fluid discharge passage 26.

When the electromagnetic valve 15 is disposed adjacent to the third surface 30c of the housing 30, the seal member 51 located in correspondence with the second pilot fluid discharge passage 27 is in close contact with the valve block 16 so as to surround the opening edge of the second pilot fluid discharge passage 27. Thus, the seal member 51 located in correspondence with the second pilot fluid discharge passage 27 seals the second pilot fluid discharge passage 27.

Figure 10:
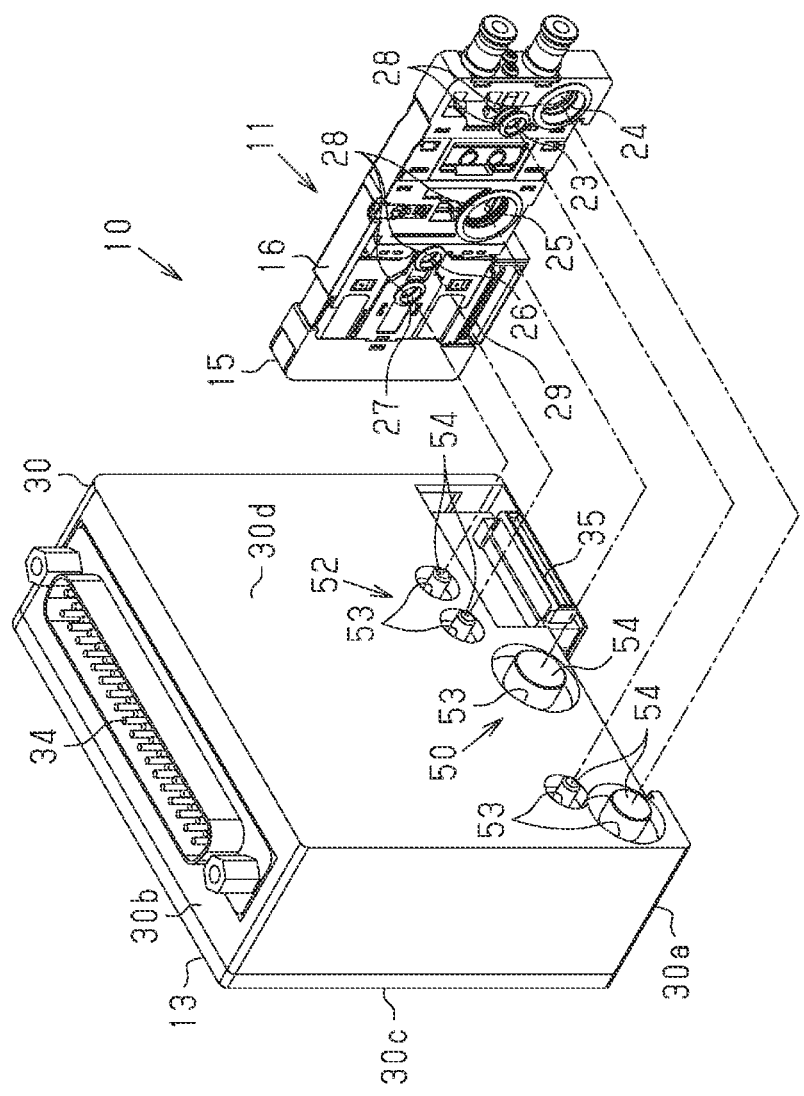
FIG. 10 is an exploded perspective view showing the relationship between the valve driving unit and the electromagnetic valve.

As shown in FIG. 10, the seal mechanism 52 is located in correspondence with each of the supply passage 23, the first discharge passage 24, the second discharge passage 25, the first pilot fluid discharge passage 26, and the second pilot fluid discharge passage 27 on the fourth surface 30d of the housing 30.

The seal mechanism 52 includes a circular recess 53 that extends along each of the supply passage 23, the first discharge passage 24, the second discharge passage 25, the first pilot fluid discharge passage 26, and the second pilot fluid discharge passage 27. The seal mechanism 52 includes columnar protrusions 54. The protrusions 54 respectively protrude from the bottom surfaces of the recesses 53 and are inserted into the supply passage 23, the first discharge passage 24, the second discharge passage 25, the first pilot fluid discharge passage 26, and the second pilot fluid discharge passage 27.

Figure 11:
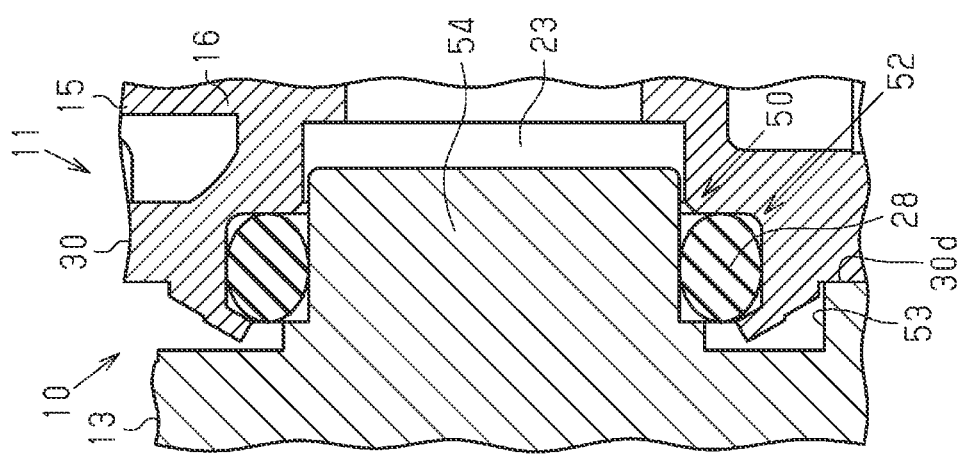
FIG. 11 is a partial exploded cross-sectional view showing the relationship between the valve driving unit and the electromagnetic valve.

FIG. 11 shows the relationship between the seal mechanism 52 and the supply passage 23. As shown in FIG. 11, the protrusion 54 of the seal mechanism 52 located in correspondence with the supply passage 23 is inserted into the supply passage 23. This causes the seal member 28 on the opening edge of the supply passage 23 to fit in the recess 53 so that the inner circumferential surface of the seal member 28 is in close contact with the outer circumferential surface of the protrusion 54. Thus, the seal mechanism 52 located in correspondence with the supply passage 23 seals the supply passage 23.

The protrusion 54 of the seal mechanism 52 located in correspondence with the first discharge passage 24 is inserted into the first discharge passage 24. This causes the seal member 28 on the opening edge of the first discharge passage 24 to fit in the recess 53 so that the inner circumferential surface of the seal member 28 is in close contact with the outer circumferential surface of the protrusion 54. Thus, the seal mechanism 52 located in correspondence with the first discharge passage 24 seals the first discharge passage 24.

The protrusion 54 of the seal mechanism 52 located in correspondence with the second discharge passage 25 is inserted into the second discharge passage 25. This causes the seal member 28 on the opening edge of the second discharge passage 25 to fit in the recess 53 so that the inner circumferential surface of the seal member 28 is in close contact with the outer circumferential surface of the protrusion 54. Thus, the seal mechanism 52 located in correspondence with the second discharge passage 25 seals the second discharge passage 25.

The protrusion 54 of the seal mechanism 52 located in correspondence with the first pilot fluid discharge passage 26 is inserted into the first pilot fluid discharge passage 26. This causes the seal member 28 on the opening edge of the first pilot fluid discharge passage 26 to fit in the recess 53 so that the inner circumferential surface of the seal member 28 is in close contact with the outer circumferential surface of the protrusion 54. Thus, the seal mechanism 52 located in correspondence with the first pilot fluid discharge passage 26 seals the first pilot fluid discharge passage 26.

The protrusion 54 of the seal mechanism 52 located in correspondence with the second pilot fluid discharge passage 27 is inserted into the second pilot fluid discharge passage 27. This causes the seal member 28 on the opening edge of the second pilot fluid discharge passage 27 to fit in the recess 53 so that the inner circumferential surface of the seal member 28 is in close contact with the outer circumferential surface of the protrusion 54. Thus, the seal mechanism 52 located in correspondence with the second pilot fluid discharge passage 27 seals the second pilot fluid discharge passage 27.

Accordingly, the passage sealing unit 50 seals the passages, namely, the supply passage 23, the first discharge passage 24, the second discharge passage 25, the first pilot fluid discharge passage 26, and the second pilot fluid discharge passage 27.

Operation

The operation of the present embodiment will now be described.

The valve driving unit power received by the valve driving unit power input port 12b from the external power supply 41 is sent to the valve driving unit 13 closest to the slave station 12 from the slave station output port 12c via the first cable 36. Subsequently, the valve driving unit power sent to one of the adjacent valve driving units 13 in the single direction X1 is delivered to the other one of the adjacent valve driving units 13 in the single direction X1 via the second cable 37. Thus, the valve driving units 13 are driven.

In addition, the control signal received by the control signal input port 12a from the master station 40 is sent to the valve driving unit 13 closest to the slave station 12 from the slave station output port 12c via the first cable 36. Subsequently, the control signal sent to one of the adjacent valve driving units 13 in the single direction X1 is delivered to the other one of the adjacent valve driving units 13 in the single direction X1 via the second cable 37. Then, the electromagnetic valve power received by the electromagnetic valve power input port 34 of each valve driving unit 13 is sent to the electromagnetic valves 15 of the corresponding valve assembly 11 from the circuit board 31. Thus, the electromagnetic valve power received by the electromagnetic valve power input port 34 of each valve driving unit 13 is supplied to the electromagnetic valves 15 of the corresponding valve assembly 11 so that the electromagnetic valves 15 are driven using the control signal.

Advantages

The above-described embodiment provides the following advantages.

(1) The valve driving unit power sent to one of the adjacent valve driving units 13 in the single direction X1 is delivered to the other one of the adjacent valve driving units 13 in the single direction X1 via the second cable 37. Further, the control signal sent to one of the adjacent valve driving units 13 in the single direction X1 is delivered to the other one of the adjacent valve driving units 13 in the single direction X1 via the second cable 37. Then, the electromagnetic valve power received by the electromagnetic valve power input port 34 of each valve driving unit 13 is supplied to the electromagnetic valves 15 of the corresponding valve assembly 11. This avoids the problem in the conventional art that the farther the electromagnetic valves 15 of the valve assembly 11 are from the slave station 12, the more easily the voltage of the electromagnetic valve power drops. Accordingly, the electromagnetic valves 15 are operated stably.

In addition, the electromagnetic valve power received by the electromagnetic valve power input port 34 of each valve driving unit 13 is supplied to the electromagnetic valves 15 of the corresponding valve assembly 11. Thus, unlike the conventional art, even if the number of the electromagnetic valves 15 is increased in the electromagnetic valve manifold 10, there is no need to prepare an additional connector having the number of output points that corresponds to the number of the electromagnetic valves 15. Accordingly, the size of the entire electromagnetic valve manifold 10 is reduced.

Additionally, the housing 30 of each valve driving unit 13 includes the passage sealing unit 50, which seals the passages. Thus, even if each valve driving unit 13 is disposed for the electromagnetic valves 15 at any position, the valve driving unit 13 is disposed for the electromagnetic valves 15 with the passages sealed by the passage sealing unit 50. This allows the number of the electromagnetic valves 15 and the positions of the valve driving units 13 to be changed easily. Accordingly, versatility is improved in the electromagnetic valve manifold 10 in which the valve assemblies 11, each including the electromagnetic valves 15 arranged in the single direction X1, are arranged in the single direction X1. This allows the electromagnetic valves 15 to be operated stably while reducing the size of the entire electromagnetic valve manifold 10, and improves the versatility.

(2) The electromagnetic valve manifold 10 includes the bracket 42, which fixes each valve driving unit 13 to the base 19. In this structure, each valve driving unit 13 is fixed to the base 19 by the bracket 42. Thus, even if a load acts on the electromagnetic valves 15, the load that has acted on the electromagnetic valves 15 is received by each valve driving unit 13. This allows the electromagnetic valves 15 to be fixed to the base 19 more strongly.

(3) The valve driving unit power sent to one of the adjacent valve driving units 13 in the single direction X1 is delivered to the other one of the adjacent valve driving units 13 in the single direction X1 via the second cable 37. The valve driving unit power sent from the slave station output port 12c of the slave station 12 is set to be higher than the driving voltage at the circuit board 31 of each valve driving unit 13. Each valve driving unit 13 includes the regulator 38.

The regulator 38 reduces the voltage of the valve driving unit power sent from the slave station output port 12c of the slave station 12 to the driving voltage at the circuit board 31 of each valve driving unit 13. This avoids the problem that the farther the valve driving unit 13 of the valve assembly is from the slave station 12, the more easily the voltage of the valve driving unit power drops.

Modifications

The above-described embodiment may be modified as follows. The above-described embodiments and the following modifications can be combined as long as the combined modifications remain technically consistent with each other.

In the embodiment, the structure of the passage sealing unit 50 is not particularly limited. The passage sealing unit 50 simply needs to seal a passage such as the supply passage 23, the first discharge passage 24, the second discharge passage 25, the first pilot fluid discharge passage 26, and the second pilot fluid discharge passage 27.

In the embodiment, the first end of the bracket 42 may be fixed to the housing 30 by, for example, fastening, to the housing 30, a screw 43 that extends through the first end of the bracket 42.

In the embodiment, the second end of the bracket 42 may be inserted through, for example, an insertion hole in the side surface 19a of the base 19. In this case, the first end of the bracket 42 is preferably fixed to the housing 30 by fastening, to the housing 30, the screw 43 that extends through the first end of the bracket 42.

In the embodiment, the electromagnetic valve manifold 10 does not have to include the bracket 42, which fixes the valve driving units 13 to the base 19.

In the embodiment, the valve driving unit power sent from the slave station output port 12c of the slave station 12 may be set in advance to the driving voltage at the circuit board 31 of each valve driving unit 13. In this case, each valve driving unit 13 of the electromagnetic valve manifold 10 does not have to include the regulator 38.

Figure 12:
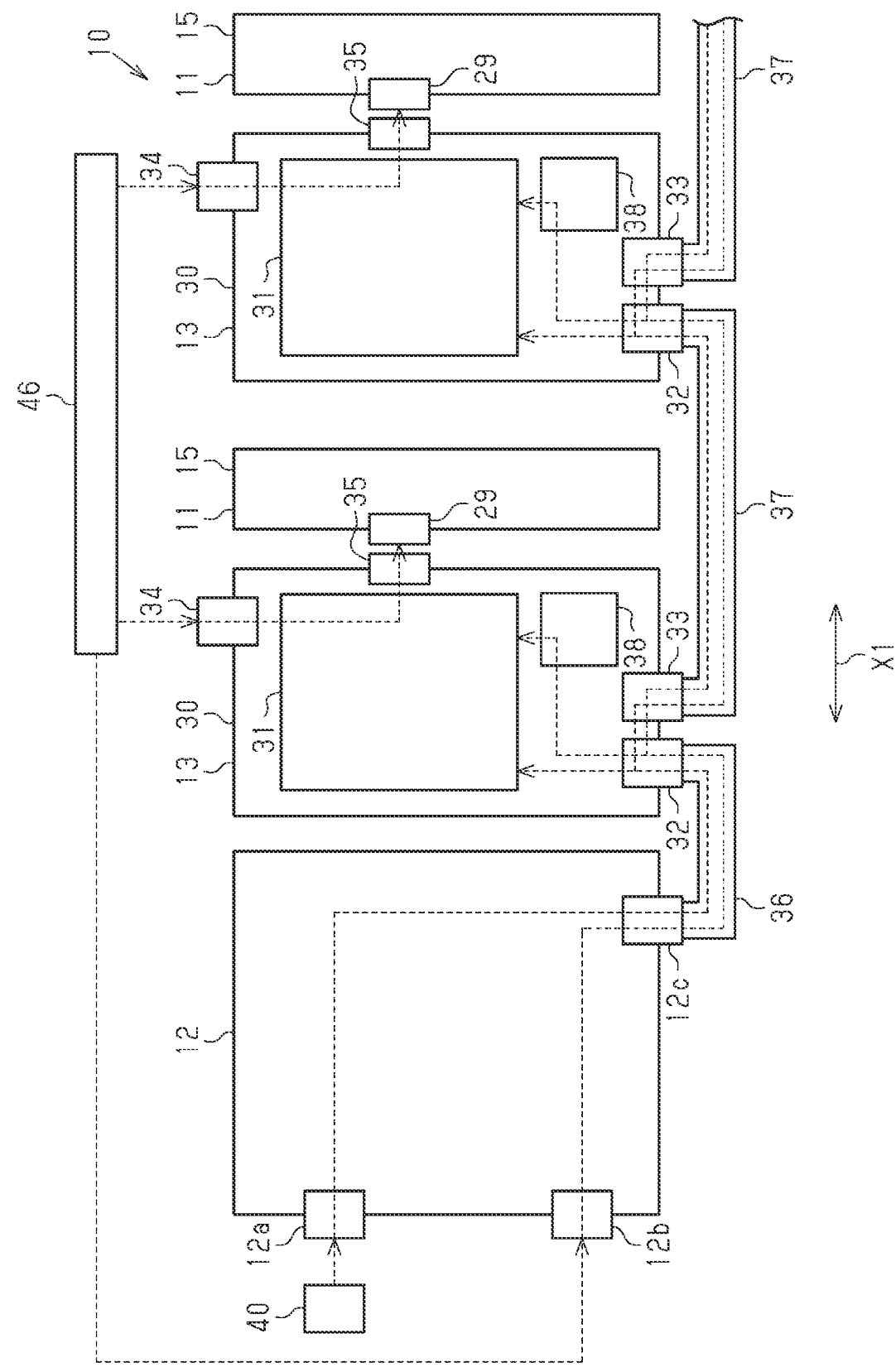
FIG. 12 is a block diagram showing the electrical configuration of the electromagnetic valve manifold according to a modification.

In the embodiment, the external power supply that sends the electromagnetic valve power to the electromagnetic valve power input port 34 may be the same as the external power supply that sends the valve driving unit power to the valve driving unit power input port 12b. For example, as shown in FIG. 12, an external power supply 46 sends power to both the electromagnetic valve power input port 34 and the valve driving unit power input port 12b.

In the embodiment, the electromagnetic valve 15 is not limited to a five-port electromagnetic valve and may be, for example, a known three-port electromagnetic valve.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An electromagnetic valve manifold, comprising:
valve assemblies arranged in a single direction, each valve assembly including electromagnetic valves arranged in the single direction; and
a slave station disposed at an end of the electromagnetic valve manifold in the single direction and configured to receive, from a master station, a control signal used to control driving of the electromagnetic valves, wherein
the electromagnetic valves each include a valve block through which a passage extends in the single direction, wherein a fluid flows through the passage,
the passages in adjacent ones of the valve blocks in the single direction connect to each other,
the electromagnetic valve manifold further comprises a valve driving unit disposed in correspondence with each of the valve assemblies, each of the valve driving units being configured to control the driving of the electromagnetic valves of a corresponding one of the valve assemblies using the control signal from the slave station,
the slave station includes:
 a control signal input port that receives the control signal from the master station;
 a valve driving unit power input port that receives valve driving unit power from a first external device, the valve driving unit power being used to drive each of the valve driving units; and
 a slave station output port that sends, to the valve driving units, the control signal received by the control signal input port and the valve driving unit power received by the valve driving unit power input port,
the valve driving units each include:
 an electromagnetic valve power input port that receives electromagnetic valve power from a second external device, the electromagnetic valve power being used to drive the electromagnetic valves of a corresponding one of the valve assemblies;
 a circuit board configured to control the driving of the electromagnetic valves of a corresponding one of the valve assemblies using the control signal from the slave station output port and send, to the electromagnetic valves, the electromagnetic valve power received by the electromagnetic valve power input port; and
 a housing that accommodates the circuit board,
the slave station output port and one of the valve driving units closest to the slave station are electrically connected to each other by a first cable,
adjacent ones of the valve driving units in the single direction are electrically connected to each other by a second cable configured to deliver the control signal and the valve driving unit power, sent to one of the adjacent ones of the valve driving units in the single direction, to the other one of the adjacent ones of the valve driving units in the single direction, and
the housing includes a passage sealing unit configured to seal the passage.

2. The electromagnetic valve manifold according to claim 1, comprising:
a base that extends in the single direction and supports the electromagnetic valves; and
a bracket that fixes each of the valve driving units to the base.

3. The electromagnetic valve manifold according to claim 1, wherein
the valve driving units each include a regulator, and
the regulator is configured to reduce a voltage of the valve driving unit power sent from the slave station output port to a driving voltage at the circuit board.

4. An electromagnetic valve manifold, comprising:
valve assemblies arranged in a single direction, each valve assembly including electromagnetic valves arranged in the single direction; and
a slave station disposed at an end of the electromagnetic valve manifold in the single direction and configured to receive, from a master station, a control signal used to control driving of the electromagnetic valves, wherein
the electromagnetic valves each include a valve block through which a passage extends in the single direction, wherein a fluid flows through the passage,
the passages in adjacent ones of the valve blocks in the single direction connect to each other,
the electromagnetic valve manifold further comprises a valve driving unit disposed in correspondence with each of the valve assemblies, each of the valve driving units being configured to control the driving of the electromagnetic valves of a corresponding one of the valve assemblies using the control signal from the slave station,
the slave station includes:
  a control signal input port that receives the control signal from the master station;
  a valve driving unit power input port that receives valve driving unit power from an external device, the valve driving unit power being used to drive each of the valve driving units; and
  a slave station output port that sends, to the valve driving units, the control signal received by the control signal input port and the valve driving unit power received by the valve driving unit power input port,
the valve driving units each include:
  an electromagnetic valve power input port that receives electromagnetic valve power from the external device, the electromagnetic valve power being used to drive the electromagnetic valves of a corresponding one of the valve assemblies;
  a circuit board configured to control the driving of the electromagnetic valves of a corresponding one of the valve assemblies using the control signal from the slave station output port and send, to the electromagnetic valves, the electromagnetic valve power received by the electromagnetic valve power input port; and
  a housing that accommodates the circuit board,
the slave station output port and one of the valve driving units closest to the slave station are electrically connected to each other by a first cable,
adjacent ones of the valve driving units in the single direction are electrically connected to each other by a second cable configured to deliver the control signal and the valve driving unit power, sent to one of the adjacent ones of the valve driving units in the single direction, to the other one of the adjacent ones of the valve driving units in the single direction, and
the housing includes a passage sealing unit configured to seal the passage.

* * * * *